Sept. 30, 1969     A. L. HUBBARD     3,469,379

COTTON HARVESTER

Filed June 23, 1966

INVENTOR.
A. L. HUBBARD

BY William A. Murray

ATTORNEY

United States Patent Office
3,469,379
Patented Sept. 30, 1969

3,469,379
COTTON HARVESTER
Arthur Lowell Hubbard, Des Moines, Iowa, assignor to Deere & Company, Moline, Ill., a corporation of Delaware
Filed June 23, 1966, Ser. No. 559,952
Int. Cl. A01d 45/20
U.S. Cl. 56—41
4 Claims

ABSTRACT OF THE DISCLOSURE

A moistener mechanism for use in a cotton harvester that has a vertically disposed picking drum that is rotatable by a centrally located drive shaft. The moistener mechanism includes a fluid dispensing device composed of inner and outer concentric members with the inner member being supported and coupled to the drum shaft and the outer member being held against rotation. The inner member has a fluid inlet passage and the outer member has angularly spaced outlet passages leading to the moistener mechanisms on the harvester. As the inner member rotates the inlet passage intermittently comes into registry with the outlet passages.

---

This invention relates to a cotton harvester and more particularly to the moistening devicecs used in a cotton harvester to moisten and clean the picking spindles of the harvester. Still more particularly this invention relates to an automatic valve device that operates to dispense cleaning fluid to the moistening mechanisms at intervals depending upon the rate of operation of the harvesting mechanism.

The conventional type harvesting mechanism for a cotton harvester includes an upright rotatable drum having laterally extending spindles that are adapted to move into the plants as they pass through the harvester. The spindles have barbs on their surfaces that snag onto the fibers of the cotton balls and draw the cotton bolls into the harvester housing. Doffing mechanism within the housing removes the cotton bolls from the spindles. The very nature of the spindles tends to collect various of the plant juices, dust, and other foreign material that unless cleaned or removed from the surface of the spindles causes a buildup on the spindles that reduces the efficiency of the picking or harvesting operation. Consequently provided alongside the harvesting drums is a column of moistener pads that engage the surface of the spindles prior to the time the spindles move into the plants. Fluid is provided for the moisteners which tend to dampen and to clean the spindles. However, in order to not damage the cotton, it is necessary to move the fluid into the moistener device at a relatively slow rate. It has been conventional to provide a small valve that moves the material onto the spindles at a relatively slow but continuous rate.

The difficulty with such a metering system for the moistener mechanism is that the small orifices required often become clogged through buildup of foreign matter moving with the moistener fluid and consequently part of the moistener pads often will not receive fluid while other of the moistener pads receive a comparatively larger quantity of water or liquid.

With the above in mind, it is the primary object of the present invention to provide in the moistener mechanism a fluid dispensing valve that permits relatively larger quantities of water to move into the moistener mechanism at intervals. The larger quantity of water will not require a small orifice through which the water or fluid may move. More specifically, it is the object of the present invention to provide a valve device composed of concentric and relatively rotatable members. One of the members is fixed to the housing structure and will not rotate while the other of the members is connected to a drive mechanism on the harvester which causes the member to rotate. A fluid conduit extends from the fluid container, also on the harvester, into the rotatable member and a series of fluid conduits extend from the rigid or fixed member into the upper ends of the moistener columns. In a two-row cotton harvester there are four moistener columns and consequently there would be four conduits extending from the fixed member. Fluid passages are provided in the members so that fluid will move from the inlet conduit into the fluid conduits extending to the moistener mechanisms at consecutive intervals. This structure has an additional advantage inasmuch as the rate of fluid dispensing is substantially proportionate to or variable with the rate of movement of the harvester over the ground. When the harvester is in the middle of the field, the driving mechanism for the harvesting drums will rotate at a relatively high rate. The fluid dispensing device will rotate at a similar rate and consequently fluid moving into the respective moistener columns will be relatively small. However, at the ends of the cotton rows, the harvester will be slowed for purposes of turning and consequently the fluid will move into the conduits leading to the moisteners for a comparatively longer period of time and a larger quantity of fluid will pass onto the pads and onto the spindles as the harvester is turning. Consequently a flushing effect is created at the ends of the rows which does a more thorough job of cleaning and wiping the spindles.

Other objects and advantages of the invention will become apparent to those skilled in the art as the nature of the invention is better understood from the following description and as shown in the accompanying drawings.

Figure 1:
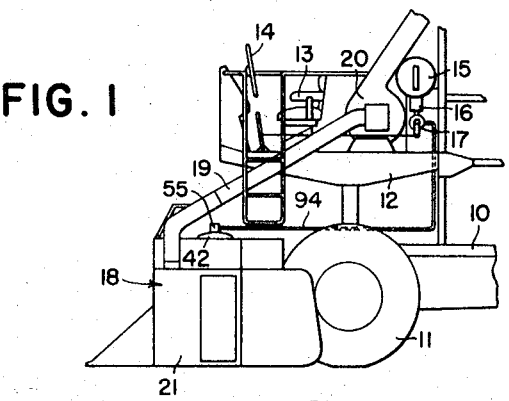
FIG. 1 is a side view of the forward portion of a cotton harvester.

Referring to FIG. 1, the present invention is incorporated in a cotton harvester composed of a mobile vehicle or tractor shown only partially by a main frame 10 and its forward traction wheels 11. Supported on the main frame 10 is an overhead platform 12 having an operator's station indicated by a seat 13 and steering column 14. Also supported on the platform 12 is a fluid container 15 having a filter 16 and valve 17 on its underside. Supported forwardly of the vehicle is a plurality of harvesting units 18 having blower discharge ducts 19 that feed the ripened cotton bolls through a blower mechanism 20, on the platform 12, which in turn blows the material into a container, not shown, but also supported on the main frame 10. The cotton harvester here shown is more or less thown in representative form. It should be recognized that the basic cotton harvesting unit is well known commercially and may be of the type shown and described in U.S. Patent 2,660,852 which issued to Mr. L. A. Paradise, Dec. 1, 1953. Conventionally there are two harvesting units 18 that are adapted to harvest adjacent rows of plants as the harvester advances. The harvesting units 18 are composed of housing structures 21. Each housing structure 21 has a fore-and-aft extending passage therein that receives the respective plant row. Positioned on opposite sides of the passage are upright harvesting drums 23 having laterally and vertically spaced picking spindles 22. There are normally two drums for each picking unit 18 and the drums are disposed on opposite sides of the passage and in fore-and-aft relation to one another. Consequently in a conventional two-row cotton harvester there would be four harvesting drums 23.

Figure 2:
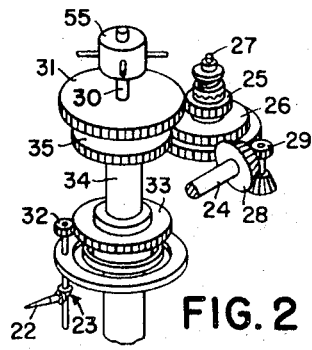
FIG. 2 is a perspective and partial schematic drawing of the drive mechanism of a cotton harvesting unit utilized in the cotton harvester.

Referring now particularly to FIG. 2, the drums 23 are driven from a main drive shaft 24 that is drivingly connected to a power take-off shaft on the tractor. The main shaft 24 drives a pair of spur gears 25, 26 on an idler shaft 27 by means of a bevel gear drive 28 and a spur gear drive 29. The spur gear 25 drives a drum shaft 30 through a spur gear 31 keyed thereto. The gear 26 drives the spindles 22 through a planet gear 32 that is drivingly engageable with a sun gear 33. The sun gear 33 is supported on a hollow column 34 that fits concentrically outwardly of the main shaft 30 and it is itself driven by an upper gear 35 that engages the gear 26. While the structure shown in FIG. 2 is substantially representative of the drive to the harvesting units, it is shown primarily for the purpose of indicating that there is a plurality of vertical shafts 27, 30 that are positioned in the drive to the spindles 22 and the drum 23.

Figure 3:
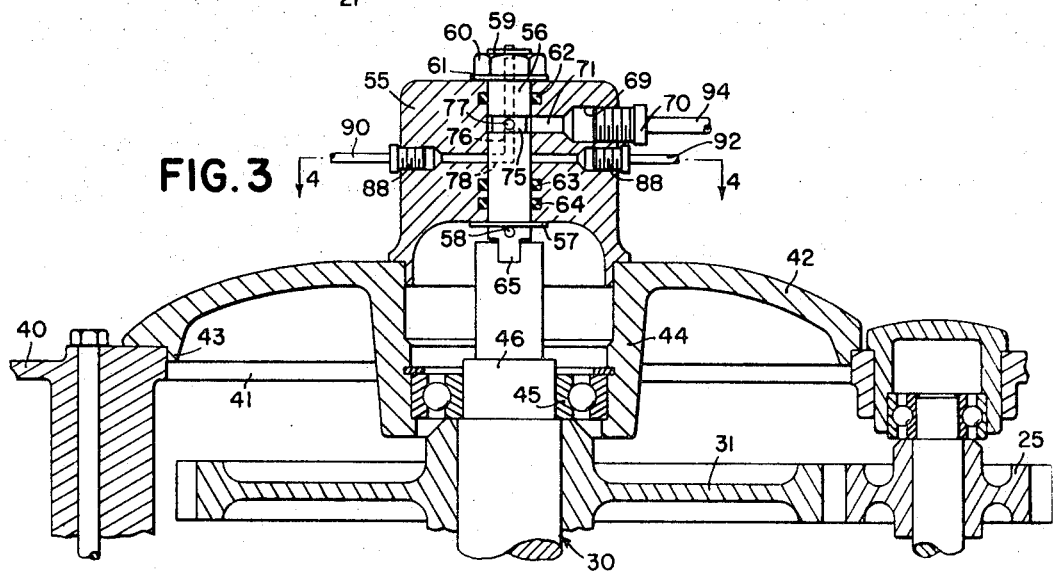
FIG. 3 is a vertical fore-and-aft extending sectional view taken through the upper portion of the drive mechanism of a cotton harvesting unit.

Referring now to FIG. 3, the housing 21 has an upper or overhead wall structure 40 with an upper annular opening 41 directly above the gear 31 and formed about the drive shaft 30. The opening 41 permits access for maintenance and repair of the drive for the various harvesting units. The opening 41 is closed by a cap or cover 42 with a lower vertical lip 43 that may be press-fitted into the opening 41. The cap 42 has a central and depending hub or boss portion 44 that carries a bearing 45 at its lower end that journals an upper recessed portion 46 of the drum shaft 30.

Vertical moistener structures 50 are disposed alongside each of the harvesting drums 23 and have upright columns 51 with laterally extending arms 52 having moistener pads at their outer ends that engage and clean the picking spindles 22. At the upper end of the columns 51 are unit fluid dispensers 53 that receive fluid and dispense it evenly into the respective arms 52, through conduits or pipes retained in the columns 51. The moistener structure is better shown and described in U.S. Patent 3,004,376 which issued to Mr. A. L. Hubbard, Oct. 17, 1961.

Figure 4:
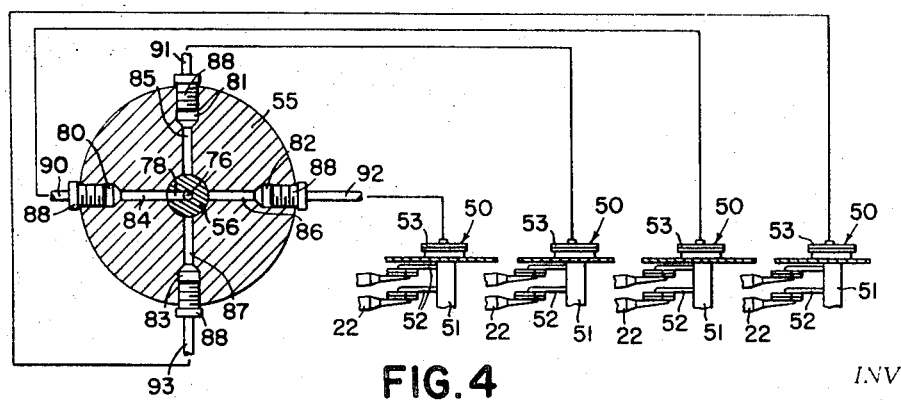
FIG. 4 is a sectional view taken substantially along the line 4—4 and showing schematic fluid connections to a plurality of harvesting mechanisms.

Referring to FIG. 4, a master fluid-dispensing device that includes a pair of relatively movable or rotatable members 55, 56 is provided on the top of the cover 42. The outer member 55 is press-fitted into the upper portion of the opening in the boss section 44. Consequently the outer member 55 is fixed against rotation. The inner member 56 is a shaft-like member and extends through the outer member 55. The inner member 56 is held in position by means of a washer 57 that underlies and engages the lower surface of the outer member 55 and a pin 58 which retains the washer 57 against the lower surface. The upper end of the member 56 is threaded at 59 and a nut 60 is provided to loosely retain the member 56 for rotation relative to the outer member 55, a suitable washer 61 being provided between the lower surface of the nut 60 and the upper surface of the member 55. Annular sealing rings 62, 63 and 64 are provided to prevent leakage of fluid. The lower end of the inner member 56 has a downwardly projecting lug 65 that fits in a diametrical slot in the upper end of the shaft 30. Consequently, the inner member 56 rotates in unison with the shaft 30 as well as the entire drum 23 associated with the shaft.

The outer member 55 has an upper fluid inlet 69 receiving a fluid fitting 70 that leads into a radial passage 71. In registry with the passage 71 is an annular groove 75 in the surface of the rotating member 56. The rotating member 56 also has an axial passage 76 and adjoining upper and lower radial passages 77, 78 that open into the groove 75 and onto the surface of the member 56.

The outer member 55 has four fluid outlets 80, 81, 82 and 83 in communication with radial passages 84, 85, 86 and 87 respectively. The outlets 80–83 and passages 84–87 are disposed in a horizontal plane and are horizontally aligned with the lower radial passage 78 in the inner member 56. The passages and outlets are also spaced 90° apart so that the passage 78, upon rotation of the member 56, will pass adjacent and in registry with the respective passages 84–87 only a short interval during each revolution of the member 56. Fittings 88 extend into the respective outlets 80–83 and are connected to fluid lines 90, 91, 92 and 93 that lead to the dispensers 53 of the moistener mechanisms 50. A fluid line 94 extends from the valve 17 into the upper inlet fitting 70. Consequently the dispensers 53 are in communication with the container 15 by conduit means 90–94 which pass through the relative rotating members 55, 56.

In operation, the valve 17 is first opened and fluid will pass into the conduit 94 and eventually into the axial passage 76 of the member 56. Since the harvester is in operation, the entire harvesting drums 23 will be caused to rotate by the drive means which includes the upright shaft 30. This causes the inner member 56 to rotate and fluid will pass through the passage 78 intermittently and consecutively into the passages 84–87 from whence the fluid will move into the respective lines 90–93 and the respective dispensers 53.

It is particularly important that the rotating member 56 be coupled to the upper end of the shaft 30. By so doing the member 56 will rotate in proportion to the rate of rotation of the drum. Consequently when the harvester reaches the end of the rows and is turning to harvest the next adjacent rows, it will slow down considerably as will the drums 23. As the drums slow down, the shaft 30 and the rotatable member 56 will also slow down and the passage 78 will thereby be in registry with the respective passages 84–87 a considerable longer time. This will cause a flushing action on the spindles 22. This feature is desirable at the end of the rows where harvesting is at a very minimum and excess moisture can do little or no harm to the cotton.

While only one form of the invention has been shown, it should be recognized that other forms and variations will occur to those skilled in the art. Therefore while the preferred form was shown and described in concise and detailed manner for the purpose of completely illustrating the invention, it should be understood there is no intention to limit or narrow the invention beyond the broad concepts set forth in the appended claims.

What is claimed is:

1. A moistener mechanism for use in a cotton harvester having a plurality of upright rotatable units formed radially from variable speed upright rotatable drive shafts and inclding harvesting units, each of which includes vertically spaced picking spindles movable in a lateral orbit, comprising: vertical moistener structures alongside of the respective harvesting units, each structure including a plurality of moisteners spaced vertically on the order of the spindles and engageable therewith through a portion of their respective orbits and each structure having at the top thereof a unit fluid dispensing device for passing fluid to the respective moisteners of the structure; a fluid container on the harvester, a master fluid-dispensing device for intermittently passing fluid in substantial equal quantities from the container to each unit dispensing device and including a pair of vertical concentric and relatively rotatable members; a fluid inlet conduit extending from the container to one of the aforesaid members; fluid outlet conduits extending from the other of the aforesaid members to the respective dispensing devices; passage means between the members for consecutively interconnecting the inlet conduit to the respective outlet conduits at intervals upon relative rotation between the members; means fixing one of the members against rotation; and a connection between the other member and one of the drive shafts for effecting rotation of the other member in response to rotation of and in substantial proportion to the rate of movement of the units.

2. The structure as set forth in claim 1 in which the relatively movable members include inner and outer upright concentric members with the inner member being joined to rotate with the shaft and the outer member being fixed against rotation.

3. The structure as set forth in claim 2 in which the passage means includes an axial passage in the inner member receiving fluid through the inlet and interjoining a radial passage opening to the surface of the inner member, and the passage means further includes a series of angularly spaced radial passages in the outer member in communication with the respective outlets and adapted to register with the radial passage of the inner member for a portion of each revolution of the inner member.

4. The structure as set forth in claim 3 in which the harvesting unit is retained in a housing structure and the outer member is fixed to the housing structure above the respective shaft, and the inner member is joined to the shaft by a direct coupling to the shaft.

References Cited

UNITED STATES PATENTS

| | | | |
|---|---|---|---|
| 2,433,083 | 12/1947 | Baker et al. | 56—41 |
| 3,073,289 | 1/1963 | Candelise | 137—625.11 X |
| 3,137,113 | 6/1964 | Hubbard | 56—41 |
| 3,288,432 | 11/1966 | Ferrin et al. | 137—625.11 X |

LUCIE H. LAUDENSLAGER, Primary Examiner

U.S. Cl. X.R.

137—625.11